US012599994B2

(12) United States Patent (10) Patent No.: US 12,599,994 B2

Li et al. (45) Date of Patent: Apr. 14, 2026

(54) VAPOR CHAMBER, MANUFACTURING METHOD AND MANUFACTURING EQUIPMENT THEREOF

(71) Applicant: Shenzhen VC Thermal Technology Co., Ltd., Shenzhen (CN)

(72) Inventors: Jianwei Li, Shenzhen (CN); Xiaoqing Li, Shenzhen (CN)

(73) Assignee: Shenzhen VC Thermal Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/175,015

(22) Filed: Apr. 10, 2025

(65) Prior Publication Data

US 2026/0034619 A1 Feb. 5, 2026

(30) Foreign Application Priority Data

Aug. 1, 2024 (CN) .......................... 202411051252.7

(51) Int. Cl.
 *B23P 15/26* (2006.01)
(52) U.S. Cl.
 CPC .................................... *B23P 15/26* (2013.01)
(58) Field of Classification Search
 CPC .. F28D 15/043; F28D 15/0233; F28D 15/046;
 H01L 23/427; F28F 2225/00; F28F 2240/00; H05K 7/20309; H05K 7/20318; H05K 7/20327; B23P 15/26
 See application file for complete search history.

(56) References Cited

U.S. PATENT DOCUMENTS

2020/0200486 A1* 6/2020 Cheng ................... F28D 15/046
2025/0159841 A1* 5/2025 Wong ................ H05K 7/20336

* cited by examiner

*Primary Examiner* — Lee A Holly
(74) *Attorney, Agent, or Firm* — Cooper Legal Group, LLC

(57) ABSTRACT

A vapor chamber and a manufacturing method and equipment thereof includes: manufacturing an upper cover, a lower cover and a copper mesh, fixing the copper mesh in a groove on the upper cover; adding a predetermined amount of water into the groove; placing the lower cover on the upper cover on a side of the upper cover where an opening of the groove is located; vacuuming the upper cover and the lower cover located in a sealed working cavity; pressing the upper cover and the lower cover located in the sealed working cavity together by a compression assembly; and performing a welded edge sealing on the upper cover and the lower cover in the sealed working cavity.

7 Claims, 4 Drawing Sheets

VAPOR CHAMBER, MANUFACTURING METHOD AND MANUFACTURING EQUIPMENT THEREOF

CROSS-REFERENCE TO RELATED APPLICATION

This application claims the priority to Chinese patent application serial no. 202411051252.7, filed on Aug. 1, 2024. The entirety of Chinese patent application serial no. 202411051252.7 is hereby incorporated by reference herein and made a part of this specification.

TECHNICAL FIELD

The present application relates to a technical field of heat dissipation components, and, in particular, to a manufacturing method of a vapor chamber, a manufacturing equipment of a vapor chamber, and a vapor chamber.

BACKGROUND

With the ongoing miniaturization of electronic devices, product space is becoming more compact, such that the original passive cooling solution's effective convective heat transfer area is reduced, leading to heat accumulation in chips under their original power consumption, which generates excessive localized temperatures that compromise safe operation. A vapor chamber, as an independent heat dissipation solution to transfer and dissipate heat, can effectively spread heat laterally across a surface.

In a related technology, a manufacturing method of vapor chamber is as follows: firstly, producing an upper cover, a lower cover, and a copper mesh of predetermined specifications; secondly, fixing the copper mesh in a groove of the upper cover; thirdly, forming a part of a tapered rat-tail gate on both the upper cover and the lower cover; fourthly, welding an edge of the upper cover and an edge of the lower cover together; fifth, inserting a copper tube into the tapered rat-tail gate and fixing it with dispensed adhesive; sixth, injecting water into an inner cavity of a product through the copper tube; seventh, vacuuming the product cavity through the copper tube, and clamping and sealing the copper tube after a vacuum value reaches a predetermined value; eighth, heating the product to remove impurities from a product cavity; ninth, clamping and sealing the tapered rat-tail gate; tenth, cutting off the copper tube; eleventh, welding and sealing the tapered rat-tail gate.

There are three processes for the related technology mentioned above, that is, firstly, forming a tapered rat-tail gate, fixing the copper tube and the tapered rat-tail gate, and cutting off the copper tube and the tapered rat-tail gate, which may cause cumbersome processes and waste of raw materials, additionally, double degassing though the copper tube makes it difficult to control the vacuum value inside the product cavity.

SUMMARY

In order to simplify processes, reduce waste of raw materials, and accurately control a vacuum value of an inner cavity of a product, the present application provides a manufacturing method of a vapor chamber, a manufacturing equipment of a vapor chamber, and a vapor chamber.

In a first aspect, the present application provides a manufacturing method of a vapor chamber, including:

manufacturing an upper cover, a lower cover and a copper mesh, fixing the copper mesh in a groove on the upper cover, adding a predetermined amount of water into the groove, placing the lower cover on the upper cover on a side of the upper cover where an opening of the groove is located, vacuuming the upper cover and the lower cover located in a sealed working cavity, pressing the upper cover and the lower cover located in the sealed working cavity together by a compression assembly, and performing a welded edge sealing on the upper cover and the lower cover in the sealed working cavity.

By adopting the above technical solution, firstly, a water injection process is completed before pressing the upper cover and the lower cover together, so there is no need for processes of manufacturing and removing a water injection structure, thereby reducing a number of the processes and waste of raw materials; secondly, a space between the upper cover and the lower cover directly communicates with the sealed working cavity, which is achieved through the interfacial gap between the upper cover and the lower cover, so it refers to an omnidirectional connectivity, therefore, the vacuum value of the product cavity can be accurately determined by detecting the vacuum value of the sealed working cavity, and thus the vacuum value of the product cavity can be more accurately controlled to improve the product yield rate.

Optionally, when adding the predetermined amount of water into the groove and placing the lower cover on the upper cover on the side of the upper cover where the opening of the groove is located, the upper cover is located outside the sealed working cavity.

Compared to a method that the upper cover is located in the sealed working cavity when injecting water, this design has the following advantages: firstly, if it is manually operated, it is convenient for liquid injection; secondly, if it is an automated operation, there is no need to provide a liquid injection device inside the sealed working cavity, so a required volume of the sealed working cavity will be smaller, which is convenient to control the vacuum value of the sealed working cavity, thereby further accurately controlling the vacuum value of the product cavity.

Optionally, the sealed working cavity is formed by a vacuum box body and a sealing door panel, a lower wall of the vacuum box body is provided with a window, the sealing door panel is vertically slidable below the vacuum box body, when adding the predetermined amount of water into the groove and placing the lower cover on the upper cover on the side of the upper cover where the opening of the groove is located, the upper cover is on the sealing door panel, and after placing the lower cover on the upper cover on the side of the upper cover where the opening of the groove is located, the sealing door panel is moved up until the sealing door panel seals and covers the window.

Compared to a method where the upper cover needs to be transferred into the sealed working cavity over a longer distance, in this design method, the sealing door panel moves the upper cover upwards to move both the upper cover and the lower cover into the sealed working cavity, as a result, water in the upper cover is less likely to overflow, thereby improving the product yield rate, additionally, after the upper cover enters a predetermined position, the sealing door panel will cover the window, making a molding of the sealed working cavity simpler and reducing a manufacturing cost of a working equipment.

Optionally, when placing the lower cover on the upper cover on the side of the upper cover where the opening of the groove is located, the lower cover partially covers the groove to form an outgassing path.

Compared to a method where the lower cover is directly facing the upper cover, this design method has a larger conductance between the product cavity and the sealed working cavity, so a vacuum value error of the product cavity and the sealed working cavity will be smaller, so as to more accurately control the vacuum value of the product cavity.

Optionally, a plurality of outgassing paths are formed, and the plurality of outgassing paths are uniformly distributed around a center of the groove in a circular manner.

By adopting the above technical solution, during vacuuming the sealed working cavity, the lower cover experiences more uniform stress distribution, so that there will not be too much displacement of the lower cover relative to the upper cover, which facilitates subsequent positional adjustment.

Optionally, when adding the predetermined amount of water into the groove and placing the lower cover on the upper cover on the side of the upper cover where the opening of the groove is located, the upper cover is located in a predetermined position in a horizontal direction, and before pressing the upper cover and the lower cover located in the sealed working cavity together, a position of the lower cover is adjusted in the horizontal direction relative to the upper cover.

Compared to a method where the upper cover is not initially in the predetermined position in the horizontal direction, this design method does not require a horizontal movement of the upper cover in subsequent steps, so water is less likely to overflow from the upper cover, additionally, the lower cover can be adjusted and moved based on the position of the upper cover, thereby simplifying operations involved in an entire manufacturing process.

Optionally, one outgassing path is formed, the outgassing path extends along an edge of the opening of the groove, and when pressing the upper cover and the lower cover located in the sealed working cavity together, a guide component on the compression assembly converts a downward pressure into a horizontal force to perform a positional adjustment of the lower cover.

Compared to a method where a repositioning manipulator is separately provided in the sealed working cavity, this design method adjusts the position of the lower cover using the guide component before the compression assembly fully compresses, as a result, the required volume of the sealed working cavity is smaller, so that the vacuum value thereof is more easily controlled, which in turn makes it easier to control the vacuum value inside the product cavity.

In a second aspect, the present application provides a manufacturing equipment of a vapor chamber, including a frame, a vacuum upper shell, a compression clamping block, a lower vacuum sealing plate, a positioning fixture, a compression fixture, a lower plate driving device, a liquid injection device, a laser welding device, and a transfer device, the vacuum upper shell is fixed on the frame, the vacuum upper shell has the sealed working cavity with a lower opening, the compression clamping block is fixed in the sealed working cavity, the lower vacuum sealing plate is vertically slidable and is configured to cover the lower opening of the sealed working cavity, the positioning fixture is fixed on an upper surface of the lower vacuum sealing plate, the positioning fixture is configured for placing workpieces, the compression fixture is detachably arranged on the positioning fixture to clamp the workpieces together with the positioning fixture, the lower plate driving device is fixed on the frame, the lower plate driving device is connected to the lower vacuum sealing plate, the liquid injection device is arranged on the frame for performing a liquid injection, the laser welding device is installed on the vacuum upper shell, and the transfer device is configured to transfer the workpieces and the compression fixture.

In an above technical solution, firstly, the upper cover is placed on the positioning fixture through the transfer device, secondly, a liquid injection is carried out through the injection device, thirdly, the lower cover is placed on the upper cover 1 through the transfer device, fourthly, the compression fixture is placed on the workpieces through the transfer device, fifthly, the lower vacuum sealing plate is moved upward through the lower plate driving device until it covers the lower opening of the sealed working cavity, at the same time, the compression clamping block presses the compression fixture; sixth, the sealed working cavity is evacuated to a predetermined vacuum value; seventh, a welded edge sealing is carried out using the laser welding device.

In a third aspect, the present application provides a vapor chamber, which is manufactured using the manufacturing method of the vapor chamber.

By adopting the above technical solution, the vacuum value of the inner cavity of the vapor chamber is more accurate, resulting in a higher yield rate of the vapor chamber.

In summary, the present application includes at least one of the following beneficial technical effects:

1. Firstly, firstly, a water injection process is completed before pressing the upper cover and the lower cover together, so there is no need for processes of manufacturing and removing a water injection structure, thereby reducing a number of the processes and waste of raw materials; secondly, a space between the upper cover and the lower cover directly communicates with the sealed working cavity, which is achieved through the interfacial gap between the upper cover and the lower cover, so it refers to an omnidirectional connectivity, therefore, the vacuum value of the product cavity can be accurately determined by detecting the vacuum value of the sealed working cavity, and thus the vacuum value of the product cavity can be more accurately controlled to improve the product yield rate.

2. Compared to the method where the lower cover is directly facing the upper cover, this design method has a larger conductance between the product cavity and the sealed working cavity, so a vacuum value error of the product cavity and the sealed working cavity will be smaller, so as to more accurately control the vacuum value of the product cavity.

DETAILED DESCRIPTION

The present application is further described in detail below with reference to FIGS. 1-5.

Figure 1:
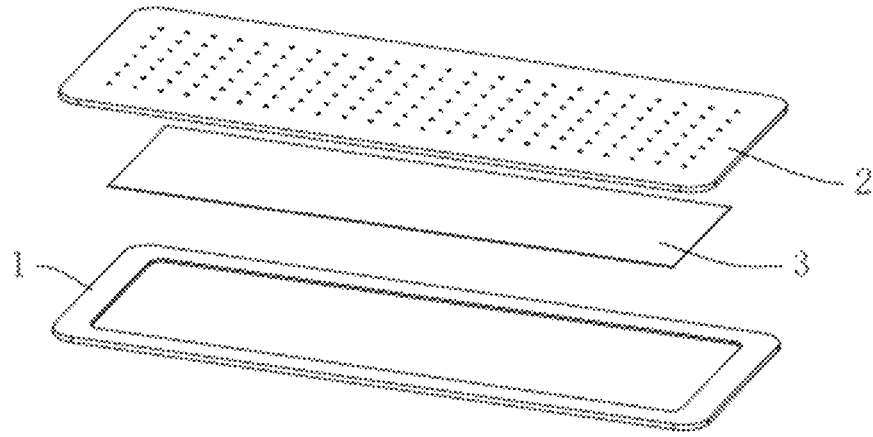
FIG. 1 is a structure view of a vapor chamber in an embodiment of the present application.

A manufacturing method of a vapor chamber is disclosed in the embodiment of the present application, including the following steps:

Referring to FIG. 1, firstly, manufacturing an upper cover 1, a lower cover 2 and a copper mesh 3, here, the upper cover 1 and the lower cover 2 are a positional relationship regarding to the vapor chamber, where the upper cover 1 will be formed with a groove, the lower cover 2 will be provided with a columnar protrusion, and the copper mesh 3 will be configured as a capillary structure of the vapor chamber; secondly, fixing the copper mesh 3 in the groove of the upper cover 1 by welding, which is commonly referred to as a spot-welded mesh in the industry; thirdly, adding a predetermined amount of water into the groove of the upper cover 1, as the amount of water in the upper cover 1 may affect a remaining space inside a product cavity, which is configured to convert water into steam to achieve a heat dissipation function of the vapor chamber, therefore, during this step it is necessary to consider how to accurately control the amount of water in the upper cover 1, specifically, if an automated device is used, an electric microinjector may be selected, while if it is manually operated, a calibrated dispensing container may be used to accurately control the amount of water in the groove; fourth, placing the lower cover 2 in the upper cover 1 on a side thereof where a groove opening is located. After the fourth step, all components required for the vapor chamber are preassembled together.

Figure 2:
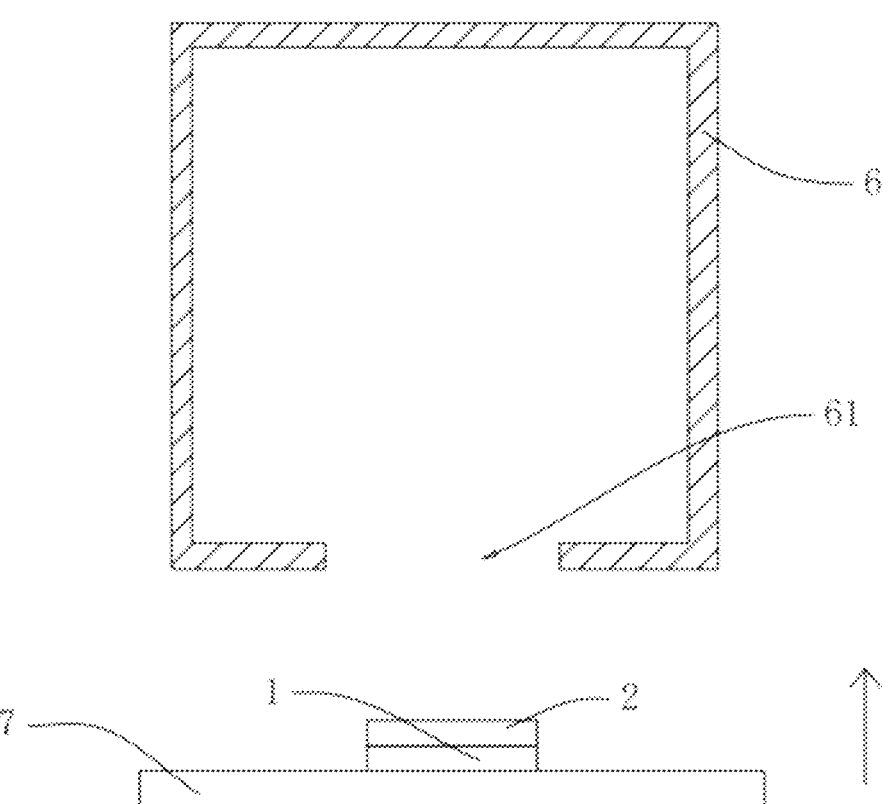
FIG. 2 is a schematic view showing how to transfer an upper cover and a lower cover into a sealed working cavity in the embodiment of the present application.
Figure 2:
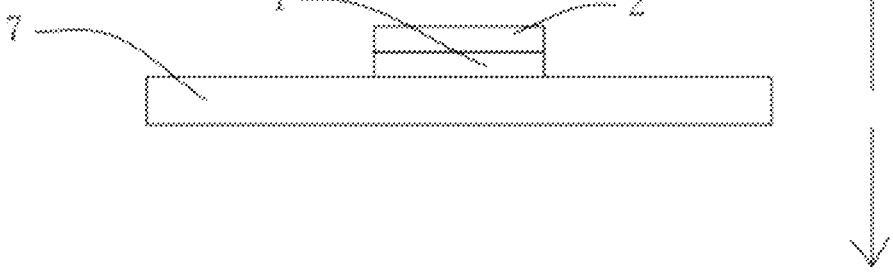

Referring to FIGS. 1 and 2, fifth, vacuuming the upper cover 1 and lower cover 2 in the sealed working cavity 4. Before the fifth step, it is necessary to pay attention to the positional relationship between the upper cover 1 and lower cover 2 and the sealed working cavity 4, which is categorized into two scenarios, if in the third and fourth steps, the upper cover 1 and the lower cover 2 are already in the sealed working cavity 4, it suffices to install a loading manipulator in the sealed working cavity 4 to accomplish the fourth step, while if in the third and fourth steps, the upper cover 1 and the lower cover 2 are not in the sealed working cavity 4, it is necessary to transfer the upper cover 1 and the lower cover 2 into the sealed working cavity 4 after the fourth step. In terms of equipment structure, the sealed working cavity 4 is formed by a vacuum box body 6 and a sealing door panel 7, the vacuum box body 6 is a fixed rectangular box and is formed with a window 61 on a lower wall of the vacuum box body 6, the sealing door panel 7 is vertically slidably arranged below the vacuum box body 6. In this regard, the upper cover 1 is located on the sealing door panel 7 in the third and fourth steps, and after the fourth step, the sealing door panel 7 moves up until it covers the window 61, so as to transport the upper cover 1 and lower cover 2 into the sealed working cavity 4.

Referring to FIGS. 1 and 2, in addition, in the fifth step, since the product cavity is connected with the sealed working cavity 4, a vacuum value of the product cavity may be determined by the vacuum value of the sealed working cavity 4, so that the vacuum value of the product cavity may be more easily controlled to improve product yield rate. However, a conductance between the product cavity and the sealed working cavity 4 may affect the accuracy of the vacuum value of the product cavity. For example, if in the fourth step, the lower cover 2 is completely aligned with the upper cover 1 and covers the groove of the upper cover 1, then a communication area between the product cavity and the sealed working cavity 4 is an interfacial gap between the upper cover 1 and the lower cover 2, in this case, the conductance between the product cavity and the sealed working cavity 4 is minimum.

Figure 3:
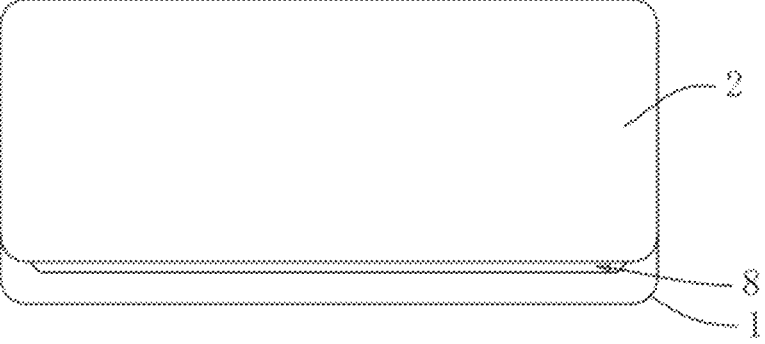
FIG. 3 is a schematic view shows an outgassing path between the upper cover and the lower cover in the embodiment of the present application.
Figure 3:
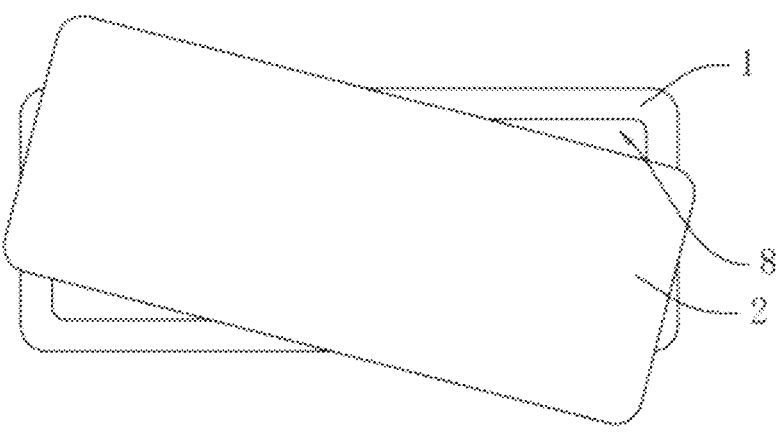

Referring to FIGS. 2 and 3, if in the fourth step, the lower cover 2 does not completely cover the groove of the upper cover 1 to form an outgassing path 8, the conductance between the product cavity and the sealed working cavity 4 may be increased within a certain range to more accurately control the product cavity, where the dimension of the outgassing path 8 shall ensure the positional stability of the lower cover 2 during vacuum evacuation. But selecting this method requires a positional adjustment to ensure that the lower cover 2 completely covers the groove of the upper cover 1 after the fifth step.

Referring to FIGS. 1 and 2, sixth, pressing the upper cover 1 and lower cover 2 together in the sealed working cavity 4. Specifically, the following method is chosen, namely keeping the supporting component below stationary and moving the compression assembly above downward, by which it is not only necessary to press on a central region of the product, but also to press on a part of an edge close to an inner side of the product during pressing, therefore, before the sixth step, it is necessary to confirm whether the upper cover 1 and lower cover 2 are in a predetermined position in a horizontal direction. If in the third and fourth steps, the upper cover 1 is not in the predetermined position in the horizontal direction, then a repositioning manipulator shall be installed in the sealed working cavity 4 regardless of the alignment status of the lower cover 2 and the upper cover 1, to move the upper cover 1 and lower cover 2 to the predetermined position in the horizontal direction.

Referring to FIGS. 2 and 3, if in the third and fourth steps, the upper cover 1 is already in the predetermined position in the horizontal direction, it is necessary to adopt different measure depending on the presence or absence of the outgassing path 8 in the fourth step. Specifically, in a case where there is no outgassing path 8, it is not necessary to perform the positional adjustment of the lower cover 2. In a case where there is the outgassing path 8, two sub-cases are further identified, if a plurality of outgassing paths 8 are uniformly distributed around a center of the groove of the upper cover 1 in a circular pattern, a repositioning manipulator is further required in the sealed working cavity 4 to move the lower cover 2 to the predetermined position, and if one outgassing path 8 extends along a side edge of the groove opening of the upper cover 1, the compression assembly shall be configured with a guide component, which can be a guide rod or an inclined guide surface, to convert a downward pressure into a horizontal force to achieve the positional adjustment of the lower cover 2.

Referring to FIG. 2, seventh, perform a welded edge sealing on the upper cover 1 and the lower cover 2 in the sealed working cavity 4 by means of laser welding.

The implementation principle of the manufacturing method of a vapor chamber in the present application is as follows. Firstly, a water injection process is completed before pressing the upper cover 1 and the lower cover 2 together, so there is no need for processes of manufacturing and removing a water injection structure, thereby reducing a number of the processes and waste of raw materials; secondly, a space between the upper cover 1 and the lower cover 2 directly communicates with the sealed working cavity 4, which is achieved through the interfacial gap between the upper cover 1 and the lower cover 2, so it refers to an omnidirectional connectivity, therefore, the vacuum value of the product cavity can be accurately determined by detecting the vacuum value of the sealed working cavity 4, and thus the vacuum value of the product cavity can be more accurately controlled to improve the product yield rate.

The embodiment of the present application discloses a manufacturing equipment of vapor chamber.

Figure 4:
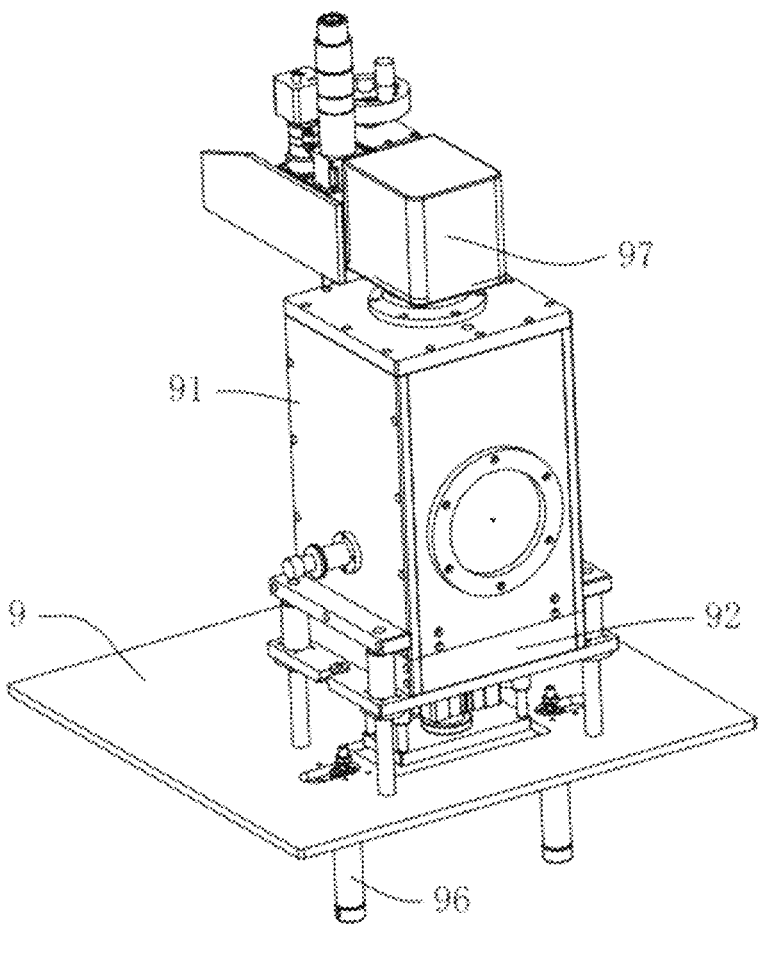
FIG. 4 is an overall structure view of a manufacturing equipment of a vapor chamber in the embodiment of the present application.
Figure 5:
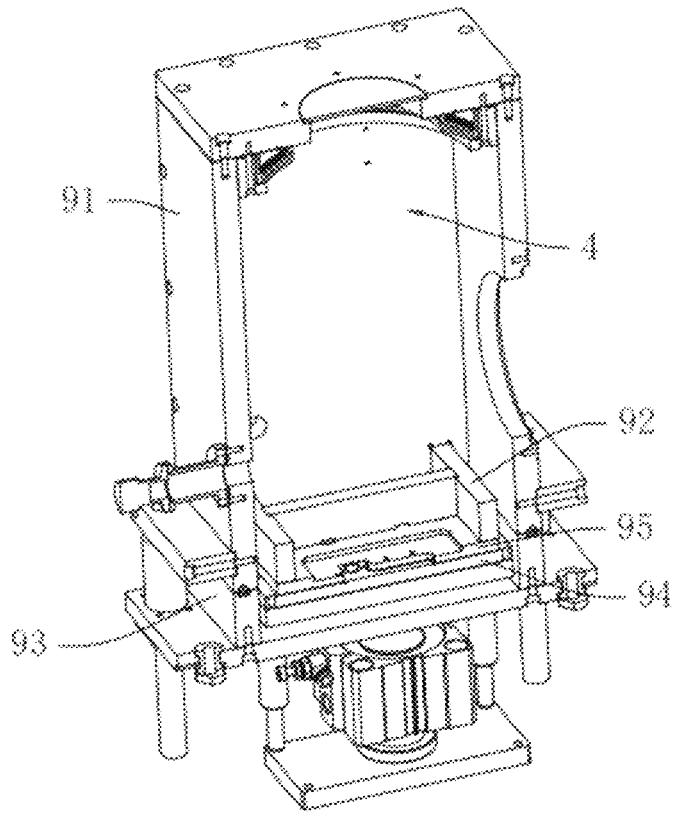
FIG. 5 is a cross-sectional view of the manufacturing equipment of a vapor chamber in the embodiment of the present application.

Referring to FIGS. 4 and 5, specifically, the manufacturing equipment includes a frame 9, a vacuum upper shell 91, a compression clamping block 92, a lower vacuum sealing plate 93, a positioning fixture 94, a compression fixture 95, a lower plate driving device 96, a liquid injection device, a laser welding device 97, and a transfer device. The vacuum upper shell 91 is fixedly on the frame 9, and the vacuum upper shell 91 is equivalent to the vacuum box body 6 in the manufacturing method mentioned above. The vacuum upper shell 91 has the sealed working cavity 4 in the manufacturing method mentioned above, which is formed with a lower opening on the bottom thereof. The compression clamping block 92 is fixedly installed in the sealed working cavity 4. The lower vacuum sealing plate 93 is vertically slidable and is equivalent to the sealing door panel 7 in the manufacturing method mentioned above, and the lower vacuum sealing plate 93 can cover the lower opening of the sealed working cavity 4. The positioning fixture 94 is fixedly installed on an upper surface of the lower vacuum sealing plate 93 and is configured for placing workpieces. The compression fixture 95 is detachably installed on the positioning fixture 94, to clamp the workpieces together with the positioning fixture 94. The lower plate driving device 96 is fixedly on the frame 9 and is designed as a cylinder. The lower plate driving device 96 is connected to the lower vacuum sealing plate 93 to achieve a lifting and lowering of the lower vacuum sealing plate 93. The liquid injection device is arranged on the frame 9 for performing a process of liquid injection. The laser welding device 97 is installed on the vacuum upper shell 91, and the transfer device is configured to transfer the workpieces and the compression fixture 95.

An implementation principle of the manufacturing equipment of a vapor chamber in the present application is as following. Firstly, the upper cover 1 is placed on the positioning fixture 94 through the transfer device, secondly, a liquid injection is carried out through the injection device, thirdly, the lower cover 2 is placed on the upper cover 1 through the transfer device, fourthly, the compression fixture 95 is placed on the workpieces through the transfer device, fifthly, the lower vacuum sealing plate 93 is moved upward through the lower plate driving device 96 until it covers the lower opening of the sealed working cavity 4, at the same time, the compression clamping block 92 presses the compression fixture 95; sixth, the sealed working cavity 4 is evacuated to a predetermined vacuum value; seventh, a welded edge sealing is carried out using the laser welding device 97.

The embodiment of the present application discloses a vapor chamber, which is made by the manufacturing method of the embodiment mentioned above, so it will not be repeated here.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS

1 upper cover
2 lower cover
3 copper mesh
4 sealed working cavity
5 wiper blade
6 vacuum box body
61 window
7 sealing door panel
8 outgassing path
9 frame
91 vacuum upper shell
92 compression clamping block
93 lower vacuum sealing plate
94 positioning fixture
95 compression fixture
96 lower plate driving device
97 laser welding device

What is claimed is:

1. A manufacturing method of a vapor chamber, comprising:

manufacturing an upper cover, a lower cover and a copper mesh, fixing the copper mesh in a groove on the upper cover;

adding a predetermined amount of water into the groove;

placing the lower cover on the upper cover on a side of the upper cover where an opening of the groove is located;

vacuuming the upper cover and the lower cover located in a sealed working cavity;

pressing the upper cover and the lower cover located in the sealed working cavity together by a compression assembly; and performing a welded edge sealing on the upper cover and the lower cover in the sealed working cavity.

2. The manufacturing method of the vapor chamber according to claim 1, wherein when adding the predetermined amount of water into the groove and placing the lower cover on the upper cover on the side of the upper cover where the opening of the groove is located, the upper cover is located outside the sealed working cavity.

3. The manufacturing method of the vapor chamber according to claim 2, wherein the sealed working cavity is formed by a vacuum box body and a sealing door panel, a lower wall of the vacuum box body is provided with a window, the sealing door panel is vertically slidable below the vacuum box body, when adding the predetermined amount of water into the groove and placing the lower cover on the upper cover on the side of the upper cover where the opening of the groove is located, the upper cover is on the sealing door panel, and after placing the lower cover on the upper cover on the side of the upper cover where the opening of the groove is located, the sealing door panel is moved up until the sealing door panel seals and covers the window.

4. The manufacturing method of the vapor chamber according to claim 3, wherein when placing the lower cover on the upper cover on the side of the upper cover where the opening of the groove is located, the lower cover partially covers the groove to form an outgassing path.

5. The manufacturing method of the vapor chamber according to claim 4, wherein a plurality of outgassing paths are formed, and the plurality of outgassing paths are uniformly distributed around a center of the groove in a circular manner.

6. The manufacturing method of the vapor chamber according to claim 4, when adding the predetermined amount of water into the groove and placing the lower cover on the upper cover on the side of the upper cover where the opening of the groove is located, the upper cover is located in a predetermined position in a horizontal direction, and before pressing the upper cover and the lower cover located in the sealed working cavity together, a position of the lower cover is adjusted in the horizontal direction relative to the upper cover.

7. The manufacturing method of the vapor chamber according to claim 6, wherein the outgassing path extends along an edge of the opening of the groove, and when pressing the upper cover and the lower cover located in the sealed working cavity together, a guide component on the compression assembly converts a downward pressure into a horizontal force to perform a positional adjustment of the lower cover.

* * * * *